("12") United States Patent
Braksator et al.

(10) Patent No.: US 10,831,904 B2
(45) Date of Patent: Nov. 10, 2020

(54) AUTOMATICALLY DISCOVERING ATTRIBUTE PERMISSIONS

(71) Applicant: International Business Machines Corporation, Armonk, NY (US)

(72) Inventors: Mark Braksator, Carona, CA (US); Daniel Biskar, Costa Mesa, CA (US); Bassam Hassoun, Riverside, CA (US)

(73) Assignee: International Business Machines Corporation, Armonk, NY (US)

( * ) Notice: Subject to any disclaimer, the term of this patent is extended or adjusted under 35 U.S.C. 154(b) by 324 days.

(21) Appl. No.: 15/947,887

(22) Filed: Apr. 9, 2018

(65) Prior Publication Data

US 2019/0311140 A1 Oct. 10, 2019

(51) Int. Cl.
| | | |
|---|---|---|
| *H04L 29/06* | (2006.01) | |
| *G06F 21/62* | (2013.01) | |
| *G06F 21/60* | (2013.01) | |
| *G06Q 10/06* | (2012.01) | |
| *G06F 9/445* | (2018.01) | |
| *G06F 16/903* | (2019.01) | |
| *G06F 21/51* | (2013.01) | |

(52) U.S. Cl.
CPC .......... *G06F 21/604* (2013.01); *G06F 9/4451* (2013.01); *G06F 16/903* (2019.01); *G06Q 10/06311* (2013.01); *H04L 63/102* (2013.01)

(58) Field of Classification Search
CPC .... G06F 16/903; G06F 21/604; G06F 9/4451; G06Q 10/06311; H04L 63/102
See application file for complete search history.

(56) References Cited

U.S. PATENT DOCUMENTS

| 6,473,800 | B1 | 10/2002 | Jerger et al. | |
|---|---|---|---|---|
| 8,832,846 | B2 * | 9/2014 | Udani | G06F 21/51 |
| | | | | 726/26 |
| 10,262,157 | B2 * | 4/2019 | Aralikatte | G06F 21/629 |
| 10,530,790 | B2 * | 1/2020 | Shih | H04L 63/1425 |
| 2007/0011749 | A1 | 1/2007 | Allison et al. | |
| 2007/0150511 | A1 | 6/2007 | Laguna-Macias et al. | |
| 2007/0156659 | A1 * | 7/2007 | Lim | H04L 41/0893 |
| 2012/0317638 | A1 * | 12/2012 | Carrara | G06F 21/44 |
| | | | | 726/17 |
| 2013/0019276 | A1 * | 1/2013 | Biazetti | H04L 63/102 |
| | | | | 726/1 |

(Continued)

OTHER PUBLICATIONS

"Provisioning policy entitlement parameters", IBM Knowledge Center, accessed Apr. 4, 2018, 4 pages. https://www.ibm.com/support/knowledgecenter/en/SSRMWJ_7.0.1.8/com.ibm.isim.doc/reference/cpt/cpt_ic_admin_provisionpolicy_parameters.htm.

(Continued)

*Primary Examiner* — Michael Simitoski
(74) *Attorney, Agent, or Firm* — Yee & Associates, P.C.

(57) ABSTRACT

Automatically discovering attribute permissions is provided. A profile indicating a set of attributes that can be converted into permissions for a new target instance is provided. In response to detecting that the new target instance is being added, a convertible set of attributes for the new target instance is searched for based on the profile. Search results for the convertible set of attributes are displayed. Ones of the convertible set of attributes are selected as a set of attribute permissions for the new target instance for access control to the new target instance.

18 Claims, 9 Drawing Sheets

(56) References Cited

U.S. PATENT DOCUMENTS

| | | | |
|---|---|---|---|
| 2013/0227638 A1* | 8/2013 | Giambiagi | G06F 21/00 726/1 |
| 2013/0239177 A1* | 9/2013 | Sigurdson | H04L 63/1433 726/4 |
| 2013/0246498 A1 | 9/2013 | Zucknovich et al. | |
| 2014/0075492 A1* | 3/2014 | Kapadia | H04L 63/102 726/1 |
| 2014/0181003 A1* | 6/2014 | Kling | G06F 16/254 707/600 |
| 2014/0196103 A1* | 7/2014 | Chari | H04L 63/102 726/1 |
| 2014/0196104 A1* | 7/2014 | Chari | H04L 63/20 726/1 |
| 2014/0223512 A1* | 8/2014 | Hagiwara | H04L 63/20 726/4 |
| 2014/0359692 A1* | 12/2014 | Chari | H04L 63/20 726/1 |
| 2015/0067889 A1* | 3/2015 | Baikalov | G06F 21/577 726/28 |
| 2015/0101014 A1* | 4/2015 | Giambiagi | G06F 21/604 726/1 |
| 2015/0150110 A1* | 5/2015 | Canning | H04L 63/12 726/9 |
| 2015/0269628 A1 | 9/2015 | Urtso et al. | |
| 2015/0356283 A1* | 12/2015 | Kress | G06F 21/53 726/17 |
| 2016/0098570 A1* | 4/2016 | Huang | G06F 21/604 726/17 |
| 2016/0191534 A1* | 6/2016 | Mallozzi | G06F 21/6218 726/4 |
| 2016/0232374 A1* | 8/2016 | Huang | G06F 9/468 |
| 2016/0267413 A1* | 9/2016 | Liang | G06F 21/604 |
| 2016/0350525 A1* | 12/2016 | Jiang | G06F 21/51 |
| 2016/0352778 A1* | 12/2016 | Chari | G06N 20/00 |
| 2017/0093871 A1* | 3/2017 | Abuelsaad | H04L 63/104 |
| 2017/0093872 A1* | 3/2017 | Braksator | H04L 63/20 |
| 2018/0234428 A1* | 8/2018 | Braksator | H04L 63/20 |
| 2019/0108353 A1* | 4/2019 | Sadeh | G06F 21/604 |

OTHER PUBLICATIONS

"Provisioning policies", IBM Knowledge Center, accessed Apr. 4, 2018, 3 pages. https://www.ibm.com/support/knowledgecenter/en/SSRMWJ_7.0.1.8/com.ibm.isim.doc/admin/cpt/cpt_ic_admin_provisionpolicy.htm.

* cited by examiner

Multi-Valued Attribute Permission Definitions  400

| Attribute name | erposixadmgroups | Permission name | erPosixAdmGroups |
| Type | string | Use rights value as permission | ☑ |

Required ☐
Multi-valued ☑

| Attribute value 402 | Rights value 404 | Active | Default | |
|---|---|---|---|---|
| adm | administrators group | ☑ | ○ | 🗑 |
| dev.adm | developers adm group | ☑ | ○ | 🗑 |
| test.adm | testers adm group | ☑ | ○ | 🗑 |

Add Value

Save  Cancel

FIG. 4

| Single-Valued Attribute Permission Definitions | 500 | | |
|---|---|---|---|
| Attribute name erposixmaxpwdage | | Permission name erPosixMaxPwdAge | |
| Type string | | Use rights value as permission ☐ | |
| Required ☐ | | | |
| Single-valued ☐ | | | |
| Attribute value 502 | Rights value 504 | Active | Default |
| 7 | 7 days | ☑ | ○ 🗑 |
| 14 | 2 weeks | ☑ | ○ 🗑 |
| -1 | unlimited | ☑ | ○ 🗑 |
| Add Value | | | |
| | Save | Cancel | |

FIG. 5

AUTOMATICALLY DISCOVERING ATTRIBUTE PERMISSIONS

BACKGROUND

1. Field

The disclosure relates generally to identity governance and more specifically to automatically discovering attribute permissions, along with their corresponding rights values, for a selected protected resource target by analyzing existing permission definitions and corresponding rights values of other protected resources of a same type as the selected protected resource target.

2. Description of the Related Art

Identity governance is a policy-based, centralized orchestration of user identity management and access control. Identity governance helps support enterprise Information Technology security and regulatory compliance. Identity governance enables enterprises to define, enforce, review, and audit security policies, but also map security functions to compliance requirements and, in turn, audit user access to support compliance reporting. Specific identity governance features include user administration, privileged identity management, identity intelligence, role-based identity administration, and analytics. This set of functionalities includes administration of accounts, passwords, access requests, access provisioning, and entitlement management.

All identities need to be created, managed over time (e.g., job title changes when a person gets promoted), and retired when people leave an enterprise. This may be easy to manage on a small scale, but it is very challenging to manage on a large scale. For example, many mid-sized and large enterprises have thousands of employees and hundreds of systems. Consequently, it is just not feasible for a team of administrators to manually maintain all of the changes to identities. As a result, identity governance and administration systems are necessary.

In order for people to make resource access requests and have these requests granted to them, identity governance and administration systems need to know what types of access or entitlements are available for these people. Thus, these governance and administration systems allow administrators to add, edit, and delete entitlements and other information used to describe them, such as titles, descriptions, owners, risk levels, tags, and other helpful data.

A second set of functionalities for identity governance may include segregation of duties, access certification, role engineering, role management, logging, analytics, and reporting. Segregation of duties prevents a person from performing a combination of risky activities. For example, allowing an employee the ability to perform the combination of initiating and approving a wire transfer of funds from an enterprise to the employee's own bank account should be prevented to reduce risk. In practice, segregation of duties is very difficult to implement and enforce because an administrator needs to know a lot of information about specific business functions that entitlements allow employees to perform, as well as a broad business knowledge across systems of which actions should not be combined. Identity governance and administration systems that have this functionality provide the ability to create rules that prevent defined types of access, entitlements, or roles from being granted to the same person. In addition, many of these identity governance and administration systems also perform discovery of violations based on these rules to help administrators know when a segregation of duties conflict needs to be remediated.

Further, many of these current identity governance and administration systems provide a way to perform access certifications through a user interface so that results can be easily captured, acted upon, and archived as audit evidence. Access certification is the process of reviewing the access people have within an application or platform and either confirming its correctness or removing it. This process can also be combined with access provisioning to automatically remove unauthorized access found during the access certification process.

SUMMARY

According to one illustrative embodiment, a method for automatically discovering attribute permissions is provided. A profile indicating a set of attributes that can be converted into permissions for a new target instance is provided. In response to detecting that the new target instance is being added, a convertible set of attributes for the new target instance is searched for based on the profile. Search results for the convertible set of attributes are displayed. Ones of the convertible set of attributes are selected as a set of attribute permissions for the new target instance for access control to the new target instance. According to other illustrative embodiments, a computer system and computer program product for automatically discovering attribute permissions are provided.

BRIEF DESCRIPTION OF THE DRAWINGS

FIG. 4 is a diagram illustrating an example of multi-valued attribute permission definitions in accordance with an illustrative embodiment;

FIG. 5 is a diagram illustrating an example of single-valued attribute permission definitions in accordance with an illustrative embodiment;

DETAILED DESCRIPTION

Figure 1:
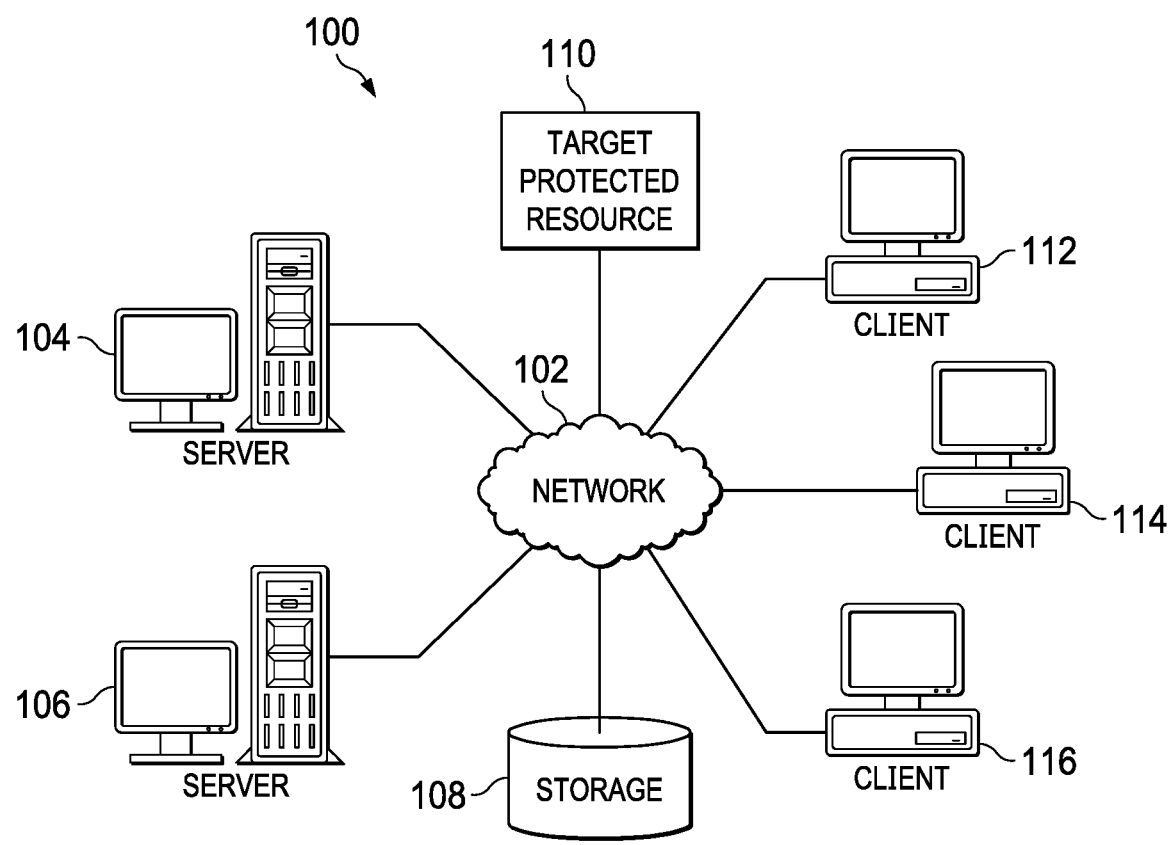
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
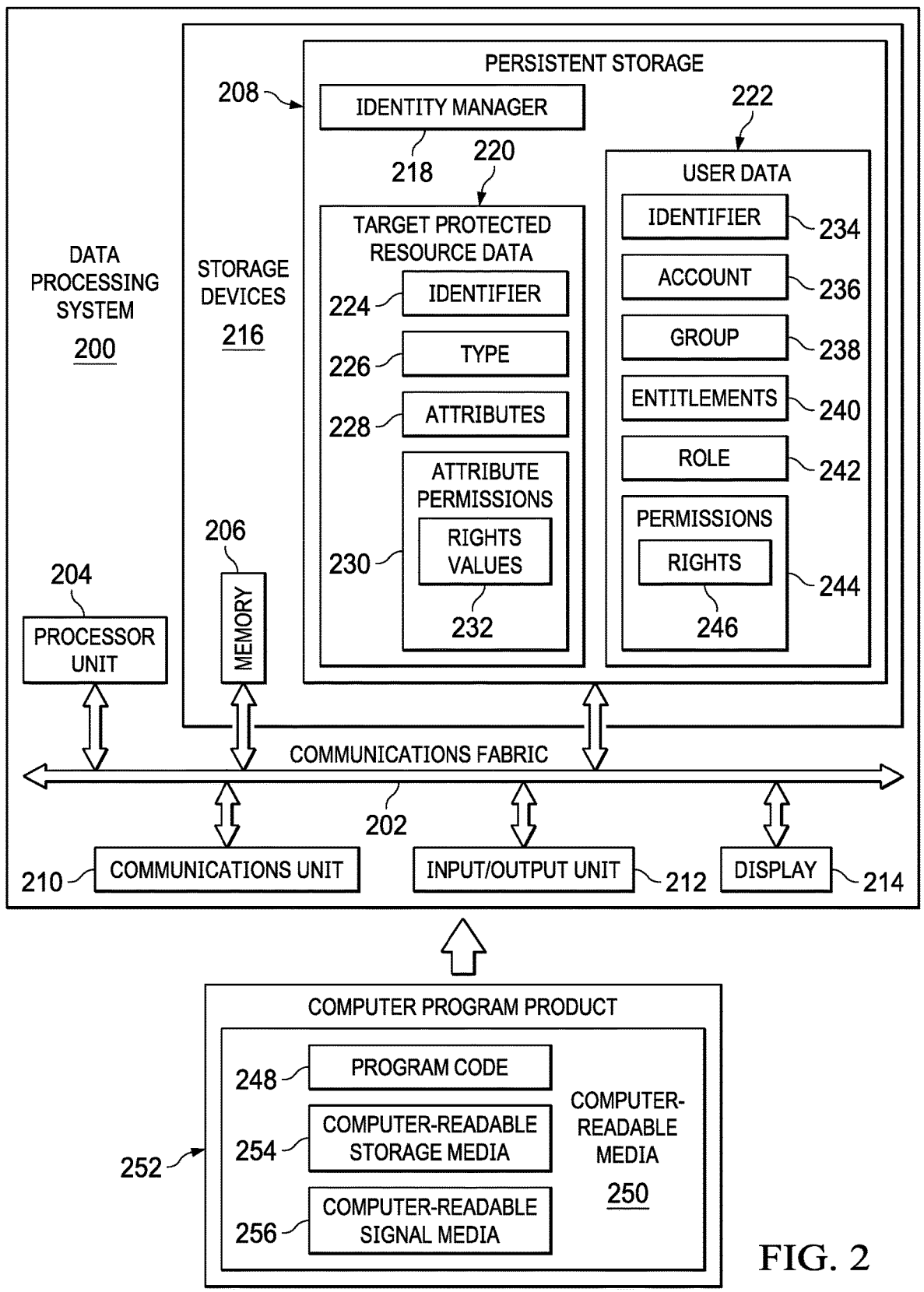
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, computers with high-speed connections to network 102. In addition, server 104 and server 106 may provide a set of identity governance services. For example, server 104 and server 106 may automatically discover attribute permissions, along with their corresponding rights values, for a selected protected resource target, such as target protected resource 110.

Target protected resource 110 represents a resource that has restricted access. In other words, server 104 and server 106 protect target protected resource 110 by restricting access to target protected resource 110 to only those users with authorization (e.g., users having the correct entitlements, permissions, rights, et cetera) to access target protected resource 110. Also, it should be noted that target protected resource 110 may represent a plurality of different types of protected resources, a plurality of same type of protected resources, or a combination of same and different types of protected resources. Further, target protected resource 110 may represent any type of resource corresponding to an enterprise, organization, institution, or agency that requires restricted access. For example, the resource may be software as a service, platform as a service, an application, a program, a computer, a data storage device, a network device, a data file, a document, or the like.

Server 104 and server 106 may automatically discover attribute permissions, along with their corresponding rights values, for target protected resource 110 by, for example, analyzing existing permission definitions and corresponding rights values of other protected resources of a same type as target protected resource 110. "Same type" means an equivalent type of protected resource. For example, if the protected resource is an application, such as a financial application, the other protected resources for analyzing existing permission definitions must be of the same or equivalent type of financial application.

Furthermore, it should be noted that server 104 and server 106 may each represent clusters of computers in data centers hosting a plurality of different identity governance services for automatically discovering attribute permissions. Alternatively, server 104 and server 106 may represent computers in a cloud environment that provides identity governance services for automatically discovering attribute permissions.

Client 112, client 114, and client 116 also connect to network 102. Clients 112, 114, and 116 are clients of server 104 and server 106. In this example, clients 112, 114, and 116 are illustrated as desktop or personal computers with wire communication links to network 102. However, it should be noted that clients 112, 114, and 116 are meant as examples only. In other words, clients 112, 114, and 116 may include other types of data processing systems, such as, for example, network computers, laptop computers, handheld computers, smart phones, smart watches, smart televisions, and the like, with wire or wireless communication links to network 102. Users of clients 112, 114, and 116 may utilize clients 112, 114, and 116 to request access to target protected resource 110, which is protected by server 104 and server 106.

Storage 108 is a network storage device capable of storing any type of data in a structured format or an unstructured format. In addition, storage 108 may represent a plurality of network storage devices. Further, storage 108 may store, for example, identifiers for a plurality of different client device users; information, such as roles, entitlements, and permissions, corresponding to each respective user in the plurality of different client device users; identifiers for a plurality of client devices corresponding to the plurality of different client device users; identifiers for a plurality of different protected resources; attributes corresponding to each respective resource in the plurality of different protected resources; permissions corresponding to each respective resource in the plurality of different protected resources; and the like. Furthermore, storage unit 108 may store other types of data, such as authentication or credential data that may include user names, passwords, and biometric data associated with client device users and system administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 112 over network 102 for use on client 112.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as sever 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores identity manager 218. However, it should be noted that even though identity manager 218 is illustrated as residing in persistent storage 208, in an alternative illustrative embodiment identity manager 218 may be a separate component of data processing system 200. For example, identity manager 218 may be a hardware component coupled to communication fabric 202 or a combination of hardware and software components.

Identity manager 218 controls the process of automatically discovering attribute permissions, along with their corresponding rights values, for a selected protected resource target, such as, for example, target protected resource 110 in FIG. 1, by analyzing existing permission definitions and corresponding rights values of other protected resources of a same type as the selected protected resource target. In addition, identity manager 218 protects the selected protected resource target by restricting access to the selected protected resource target to only those users having authorization to do so. In other words, identity manager 218 manages users, role mining, provisioning, entitlements, permissions, rights, accounts, access certification and recertification, authorization workflows, and segregation of duties to control access and evaluate regulatory compliance across applications and services.

Identity manager 218 utilizes target protected resource data 220 and user data 222 to automatically discover attribute permissions for the selected protected resource target and protect the selected protected resource target. Target protected resource data 220 represent information corresponding to the selected protected resource target. However, it should be noted that target protected resource data 220 may represent information corresponding to a plurality of different protected resources. In this example, target protected resource data 220 include identifier 224, type 226, attributes 228, and attribute permissions 230.

Identifier 224 uniquely identifies the selected protected resource target and may be, for example, a name and/or an alphanumeric sequence. Type 226 identifies the type of resource, such as a particular type of software or a particular type of hardware, which corresponds to the selected protected resource target. Attributes 228 represent the characteristics, features, aspects, elements, and/or properties of the selected protected resource target. Attributes 228 may include, for example, login information, access information, storage information, processor information, and the like.

Attribute permissions 230 represent a set of one or more attributes in attributes 228 that identity manager 218 may utilize as permission definitions for accessing the selected protected resource target. Attribute permissions 230 may include, for example, maximum hard disk usage, allowed memory, maximum login retries, maximum password age, and the like. In this example, attribute permissions 230 include rights values 232. Rights values 232 correspond to attribute permissions 230. Rights values 232 may include single-valued rights or multi-valued rights. An example of a single-valued right may be the number 7, which may represent the number of days a password will remain valid for accessing the selected protected resource target. An example of a multi-valued right may a name, which may represent a group of users having authorization to access the selected protected resource target.

Identity manager 218 automatically identifies attribute permissions 230, along with their corresponding rights values 232, for the selected protected resource target by analyzing permission definitions and their corresponding rights values of other protected resources of a same type as the selected protected resource target. Then, identity manager 218 automatically imports attribute permissions 230 and rights values 232 onto the selected protected resource target to restrict access to the selected protected resource target by users having matching entitlements, permissions, and rights.

User data 222 represent information corresponding to a particular client device user. However, it should be noted that user data 222 may represent information corresponding to a plurality of different client device users. In this example, user data 222 include identifier 234, account 236, group 238, entitlements 240, role 242, and permissions 244.

Identifier 234 uniquely identifies the client device user, such as, for example, a name and/or an alphanumeric sequence. Account 236 is an Information Technology (IT) representation of an identity of the client device user, which is expressed through an account configuration, consisting of user data 222. An account configuration is used by an application that requires authentication of the client device user. It should be noted that identity manager 218 may provision multiple accounts to the client device user. In addition, identity manager 218 may provision a single account to multiple client device users.

Group 238 represents the organization unit that the client device user is assigned to by the enterprise, organization, institution, or agency. Entitlements 240 represent access privileges assigned to members of group 238. Role 242 represents the position, function, responsibility, and/or job of the client device user. For example, role 242 may indicate that the client device user is a manager, supervisor, administrator, executive, or the like. Role 242 identifies a set of permissions, such as permissions 244, that are assigned to the client device user.

Permissions 244 represent authorization or security clearance to access one or more particular protected resources by the client device user. It should be noted that permissions 244 may be included in account 236, which corresponds to the client device user. In this example, permissions 244 include rights 246. Rights 246 represent additional characteristics related to permissions 244. Rights 246 may be defined by two qualifiers, such as a key and a value. The key may be an identifying name, for example, while the value may be defined every time a right is defined. In addition, the value may either be single-value or multi-value, only a single rights value is chosen from a potential set when defining an assignable permission. However, it is possible to have a complex attribute associated with multiple permissions. "RACF erconnectgroup" would be an example of a complex attribute. Each sub-attribute along with its rights value is then considered a separate permission.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, short-wave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 248 is located in a functional form on computer readable media 250 that is selectively removable and may be loaded onto or transferred to data processing system 200 for running by processor unit 204. Program code 248 and computer readable media 250 form computer program product 252. In one example, computer readable media 250 may be computer readable storage media 254 or computer readable signal media 256. Computer readable storage media 254 may include, for example, an optical or magnetic disc that is inserted or placed into a drive or other device that is part of persistent storage 208 for transfer onto a storage device, such as a hard drive, that is part of persistent storage 208. Computer readable storage media 254 also may take the form of a persistent storage, such as a hard drive, a thumb drive, or a flash memory that is connected to data processing system 200. In some instances, computer readable storage media 254 may not be removable from data processing system 200.

Alternatively, program code 248 may be transferred to data processing system 200 using computer readable signal media 256. Computer readable signal media 256 may be, for example, a propagated data signal containing program code 248. For example, computer readable signal media 256 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 248 may be downloaded over a network to persistent storage 208 from another device or data processing system through computer readable signal media 256 for use within data processing system 200. For instance, program code stored in a computer readable storage media in a data processing system may be downloaded over a network from the data processing system to data processing system 200. The data processing system providing program code 248 may be a server computer, a client computer, or some other device capable of storing and transmitting program code 248.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 254 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In identity governance, one repetitive and commonly encountered administrative tasks is defining attribute permissions, which correspond to a target protected resource and are assignable to users. These permissions are usually defined on an attribute of the target protected resource, such as "maximum disk usage", "allowed memory", et cetera. However, protected resources typically contain a large number of attributes out of which only a portion may be suitable as permissions. These attribute permission candidates are not easily distinguishable from the other attributes and an administrator has to potentially review many pages of similarly looking attributes to identify a few that the administrator may use as permissions.

Illustrative embodiments enable identity governance systems to easily discover only those protected resource attributes that can be defined as permissions and automatically apply these discovered permissions to protected resources of a same type. This is an improvement over existing solutions, in which permissions need to be manually and separately defined and published for each target protected resource, even if multiple target protected resources of the same type ultimately end up having the same permission definitions.

Further, illustrative embodiments may apply the result of permission discovery to a provisioning policy defined at a target instance or at a target type level. Currently, when defining a provisioning policy, an administrator defines the provisioning parameters manually one by one. An improvement over existing solutions is illustrative embodiments applying a subset of automatically discovered attribute permissions by automatically converting discovered attribute permissions into provisioning parameters within a policy. The discovery phase in this case could also more directly encompass all provisioning policies defined at the target instance level for the same target type. The result would be a set of provisioning parameters, which illustrative embodiments may then apply on a more general provisioning policy defined at target type scope.

A further advantage of illustrative embodiments is that illustrative embodiments automatically search for permissions and corresponding rights values of target protected resources of a same type is using a single complex structured query language (SQL) search statement over indexed data and automatically return the results instantaneously. A human being would have to break the search down into multiple steps and combine the individual result parts, which would be time prohibitive and error-prone. Furthermore, a human being would be unable to monitor all target protected resources in real-time to trigger the search at the right time. For example, the right time would be the earliest time when illustrative embodiments can detect that a new target instance or a provisioning policy is being added to trigger background discovery of permissions on existing targets or policies of the same target type.

Figure 3:
FIG. 3 is a diagram illustrating an example of target protected resource attributes in accordance with an illustrative embodiment.

With reference now to FIG. 3, a diagram illustrating an example of target protected resource attributes is depicted in accordance with an illustrative embodiment. Attributes of target protected resource 300 may be, for example, attributes 228 in FIG. 2. Attributes of target protected resource 300 represent a list of characteristics, features, aspects, elements, and/or properties that correspond to a target protected resource, such as target protected resource 110 in FIG. 1.

In this example, an identity manager, such as identity manager 218 in FIG. 2, automatically identifies attribute 302, attribute 304, attribute 306, attribute 308, attribute 310, and attribute 312 as candidate attribute permissions for import onto the selected target protected resource. Attributes 302, 304, 306, 308, 310, and 312 may be, for example, a library that binds functions; a tab that schedules background tasks, such as file cleanup; file size; login allowed; login retries; and minimum password age. Also, in this example, the identity manager previously imported attribute 314 and attribute 316 as attribute permissions onto the selected target protected resource. Attributes 314 and 316 may be, for example, administrative groups and password maximum age. Further, attribute 318, which was not automatically discovered by the identity manager as a candidate attribute permission, was indicated by a customer as assignable to the selected target protected resource with rights. Attribute 318 may be, for example, login times for the selected target protected resource.

The identity manager utilizes a sequence of steps to automatically import all attribute permission candidates defined on a selected target profile. First, an administrator indicates in a target profile which attributes are typically considered permissions for a target protected resource. The administrator imports the target profile into the identity manager. The identity manager then defines an instance of the target protected resource. In addition, the identity manager automatically discovers all attribute permissions corresponding to the target instance by analyzing permissions of protected resources of a same type. The identity manager then automatically imports the discovered attribute permissions onto the target instance. However, it should be noted that automatic importing of attribute permissions onto the target instance may be optional on alternative illustrative embodiments. Further, the identity manager assigns the permissions to authorized client device users based on, for example, accounts, groups, entitlements, and the like, which correspond to each respective client device user.

With reference now to FIG. 4, a diagram illustrating an example of multi-valued attribute permission definitions is depicted in accordance with an illustrative embodiment. The multi-valued attribute profile metadata, shown below, identifies the name of the attribute (i.e., "erPosixAdmGroups") as a permission candidate and specifies a set of available rights values available for assignment if defined as a permission during deployment:

```
{
    "name": "erPosixAdmGroups",
    "type": "string",
    "multiValued": true,
    "description": "The groups the user administrates",
    "required": false,
    "caseExact": false,
    "mutability": "readWrite",
    "returned": "default",
    "uniqueness": "none",
    "isPermission" : true,
    "permissionRights: [
        "adm", "dev.adm", "test.adm"
    ].
```

However, it should be noted that the "permissionRights" section above is optional in alternative illustrative embodiments. Using the metadata above, an identity manager, such as identity manager 218 in FIG. 2, automatically identifies three permissions in multi-valued attribute permission definitions 400. The three permissions for the administrative groups attribute are administrators, developer administrators, and tester administrators, which are shown in multi-valued attribute value 402. In addition, multi-valued attribute permission definitions 400 includes rights value 404, which corresponds to multi-valued attribute value 402. In this example, rights value 404 is a name of an organizational unit, such as an administrators group, a developer administrators group, and a tester administrators group.

With reference now to FIG. 5, a diagram illustrating an example of single-valued attribute permission definitions is depicted in accordance with an illustrative embodiment. The single-valued attribute profile metadata, shown below, identifies the name of the attribute (i.e., "erPosixPwdMaxAge") as a permission candidate and specifies a set of available rights values available for assignment if defined as a permission during deployment:

```
{
    "name": "erPosixPwdMaxAge",
    "type": "integer",
    "multiValued": false,
    "description": "The maximum number of days the account can remain active after erPosixMaxPwdAge.",
    "required": false,
    "mutability": "readWrite",
    "returned": "default",
    "uniqueness": "none"
    "isPermission" : true,
    "permissionRights: [
        7, 14, -1
    ]
}.
```

However, it should be noted that the "permissionRights" section above is optional in alternative illustrative embodiments. Using the metadata above, an identity manager, such as identity manager 218 in FIG. 2, automatically identifies three rights values in single-valued attribute permission definitions 500. In this example, the three permissions for the maximum password age attribute are 7, 14, and −1, which are shown in single-valued attribute value 502. In addition, the corresponding three rights values are 7 days, 2 weeks, and unlimited, which is shown in rights value 504.

Using the data shown in the examples of FIG. 4 and FIG. 5, the identity manager may automatically inject the rights values into the profile metadata as soon as the values are discovered by the identity manager for the target protected resource using, for example, current usage pattern analysis. It should be noted that the identity manager may automatically discover attribute permissions and their most commonly used rights values by analyzing already defined permissions on other existing protected resources of the same type and/or by analyzing existing account attribute values.

Further, alternative illustrative embodiments may optionally enable this process when defining a new target instance. Steps to discover rights values for a new target may include, for example: 1) the identity manager analyzing permissions defined on all other targets of the same profile type as the new target instance and identifying a common set of permissions used across all of them; 2) the identity manager defining the same permissions on the new target instance; and 3) the identity manager checking the existence of groups used as rights values on existing targets and, if also found on the new target instance, adding them to permission definitions of the new target instance.

The identity manager may return all automatically discovered attribute permissions on a selected target profile type via an API. This API may be invoked when auto-discovery of attribute permissions is requested using for example: "List<Permission>discoverPermissions(int targetType, int method)". Furthermore, the identity manager may return data contained in the "permissionRights" section via another API. This API may be invoked when auto-discovery of rights is requested using for example: "List<RightsValue>analyzeRights(int targetType, in targetId, String attributePermissionName, int method)". The method is either zero (0) for union or one (1) for intersection.

The identity manager may apply the results of the API calls onto the given target permission asynchronously after the identity manager has completed the analysis in the background. Union of permissions means that the identity manager will add all permissions defined on each of the existing protected resources of the same type onto the new target instance. Intersection of permissions means that if all of the existing protected resources of the same type have a set of one or more permissions in common, then the identity manager will add the set of common permissions onto the new target instance. Also, if discover "Rights Values" is enabled, then the identity manager will add the rights values corresponding to discovered permissions on the existing protected resources to the new target instance. In the case of permissions requiring group names, the group names the identity manager discovered on other protected resources of the same type will be added as possible rights values to corresponding permissions if they also exist on the new target instance. It should be noted that the identity manager may perform auto-discovery of attribute permissions and their corresponding rights values at the time of defining a new target instance or at any time afterward.

As a result, illustrative embodiments decrease the time to deploy attribute permissions in an identity governance system. For example, in the automatic mode, as soon as the new target instance is defined in the identity governance system, all of its attribute permission candidates are automatically defined as available permissions and optionally with values representing available default rights.

Figure 6:
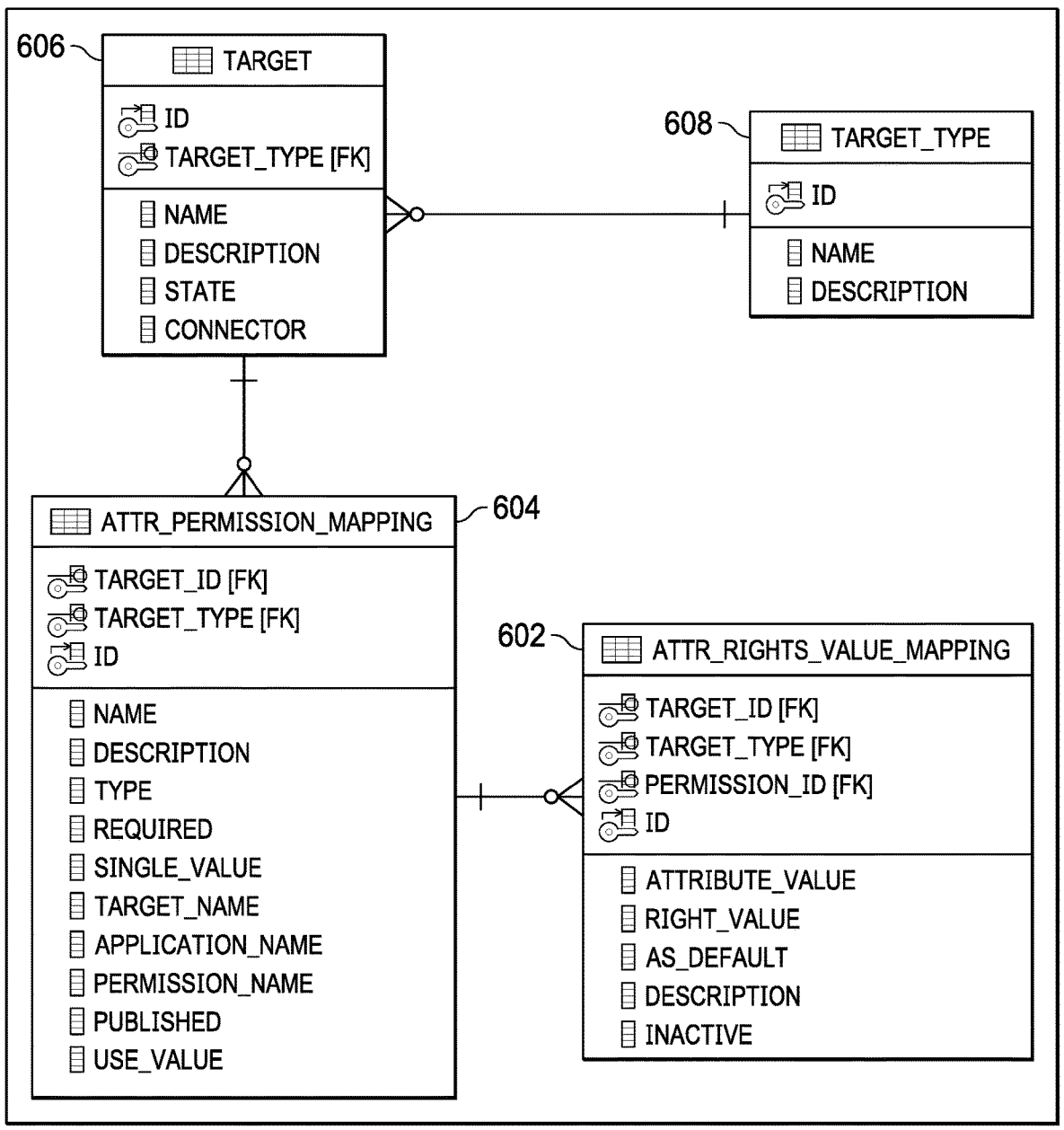
FIG. 6 is a diagram illustrating an example of an attribute permissions storing schema in accordance with an illustrative embodiment.

With reference now to FIG. 6, a diagram illustrating an example of an attribute permissions storing schema is depicted in accordance with an illustrative embodiment. Attribute permissions storing schema 600 represents target attribute permission relationships using a database schema. For example, attribute permissions storing schema 600 illustrates the relationship between attribute rights value mapping 602, attribute permission mapping 604, target 606, and target type 608.

Target 606 is defined for each managed end point. Each target has a target type 608. Each permission is defined on a selected target 606. Multiple rights values may be defined on each permission.

Query 1, shown below, performs an intersection of attribute permissions and finds all attribute permissions currently defined on every protected resource of the same type:

```
with
    set1 as (
        select DISTINCT TARGET_ID
        from IGI.ATTR_PERMISSION_MAPPING
        where TARGET_TYPE = ?1 AND TARGET_ID <> ?2),
    set2 as (
        select COUNT(t1.TARGET_ID) count
        from set1 t1),
    set3 as (
        SELECT t.NAME, t2.count
        FROM IGI.ATTR_PERMISSION_MAPPING t, set2 t2
        GROUP BY t.NAME, t2.count
        HAVING COUNT(t.TARGET_ID) = t2.count)
    select NAME from set3.
```

Query 2, shown below, performs a union of permissions and finds all permissions currently defined on any protected resource of the same type:

```
SELECT DISTINCT t1.NAME
    FROM IGI.ATTR_PERMISSION_MAPPING t1
    where t1.TARGET_TYPE = ?1 AND t1.TARGET_ID <> ?2.
```

Query 3, shown below, performs an intersection of rights values and finds all rights values for a given permission currently defined on every protected resource of the same type:

```
with
    set1 as (
        select DISTINCT TARGET_ID
        from IGI.ATTR_PERMISSION_MAPPING
        where TARGET_TYPE = ?1 AND TARGET_ID <> ?2
    AND
        NAME = ?3),
    set2 as (
        select COUNT(t1.TARGET_ID) count
        from set1 t1),
    set3 as (
        SELECT t.ATTRIBUTE_VALUE, t2.count
        FROM IGI.ATTR_RIGHTS_VALUE_MAPPING t, set2 t2
        GROUP BY t.ATTRIBUTE_VALUE, t2.count
        HAVING COUNT(t.ATTRIBUTE_VALUE) = t2.count)
    select t3.attribute_value from set3 t3.
```

Query 4, shown below, performs a union of rights values and finds all rights values for a given permission currently defined on any protected resource of the same type:

```
with
    set1 as (
        select t.id
        from IGI.ATTR_PERMISSION_MAPPING t
        where t.TARGET_TYPE = ?1 AND t.TARGET_ID <> ?2
    AND
        t.NAME = ?3),
    set2 as (
        select distinct t.ATTRIBUTE_VALUE
        from IGI.ATTR_RIGHTS_VALUE_MAPPING t, set1 t1
        where t.permission_id = t1.id)
    select t2.attribute_value from set2 t2.
```

In the above SQL statements: ?1 parameter is the target type; ?2 parameter is an ID of the target instance for which permission discovery is performed or an out of range value (e.g., −1) representing a new target instance about to be added to the system; and ?3 parameter is the attribute permission name for which the rights values are being discovered.

When illustrative embodiments resolve a rights value, such as a group name, to an artifact on a managed end point, illustrative embodiments make an additional check in code to ensure that the rights value discovered on other protected resources resolves to a valid group name on the new target instance.

Figure 7A:
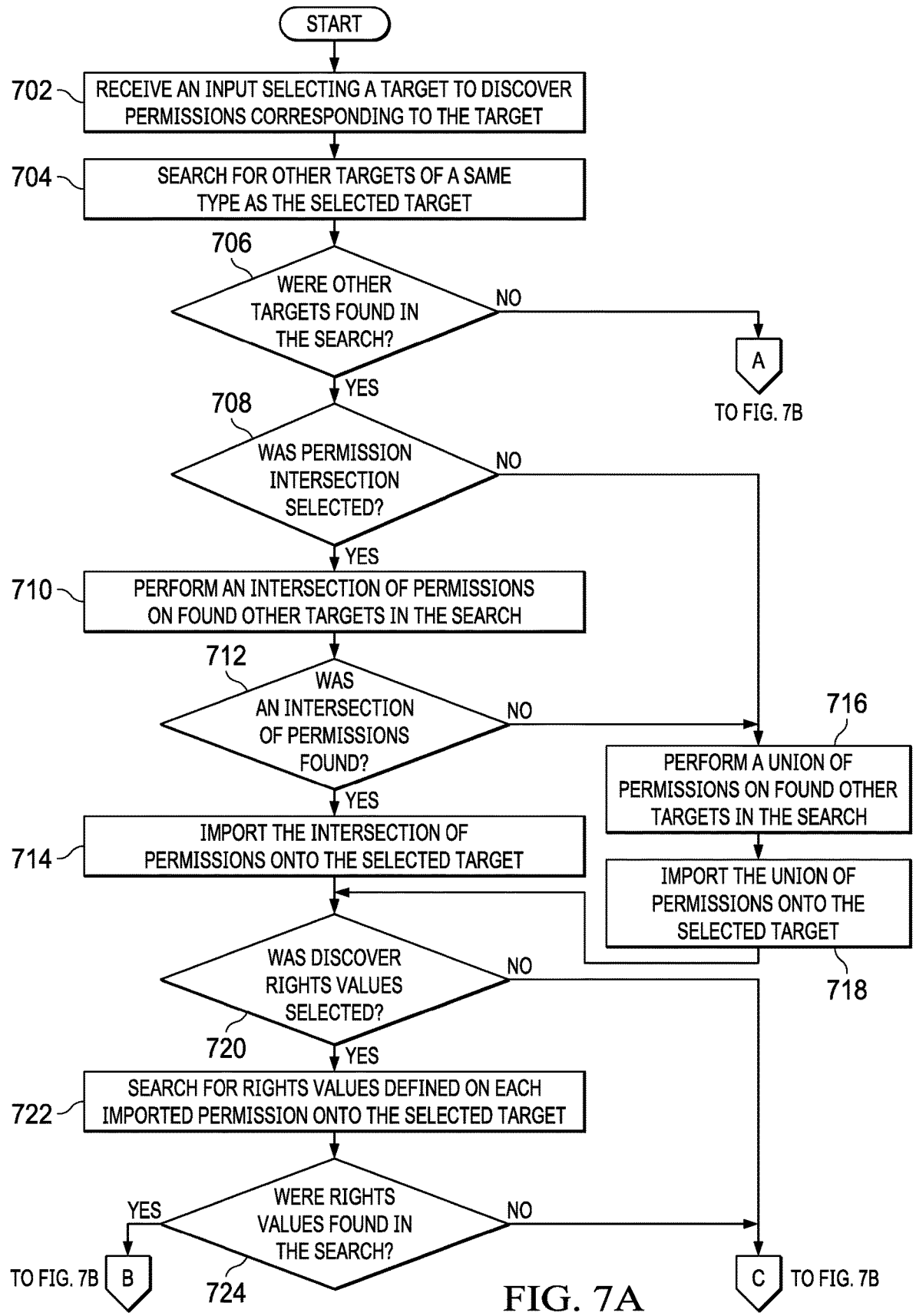
FIGS. 7A-7B are a flowchart illustrating a process for automatically discovering attribute permissions in accordance with an illustrative embodiment.
Figure 7B:
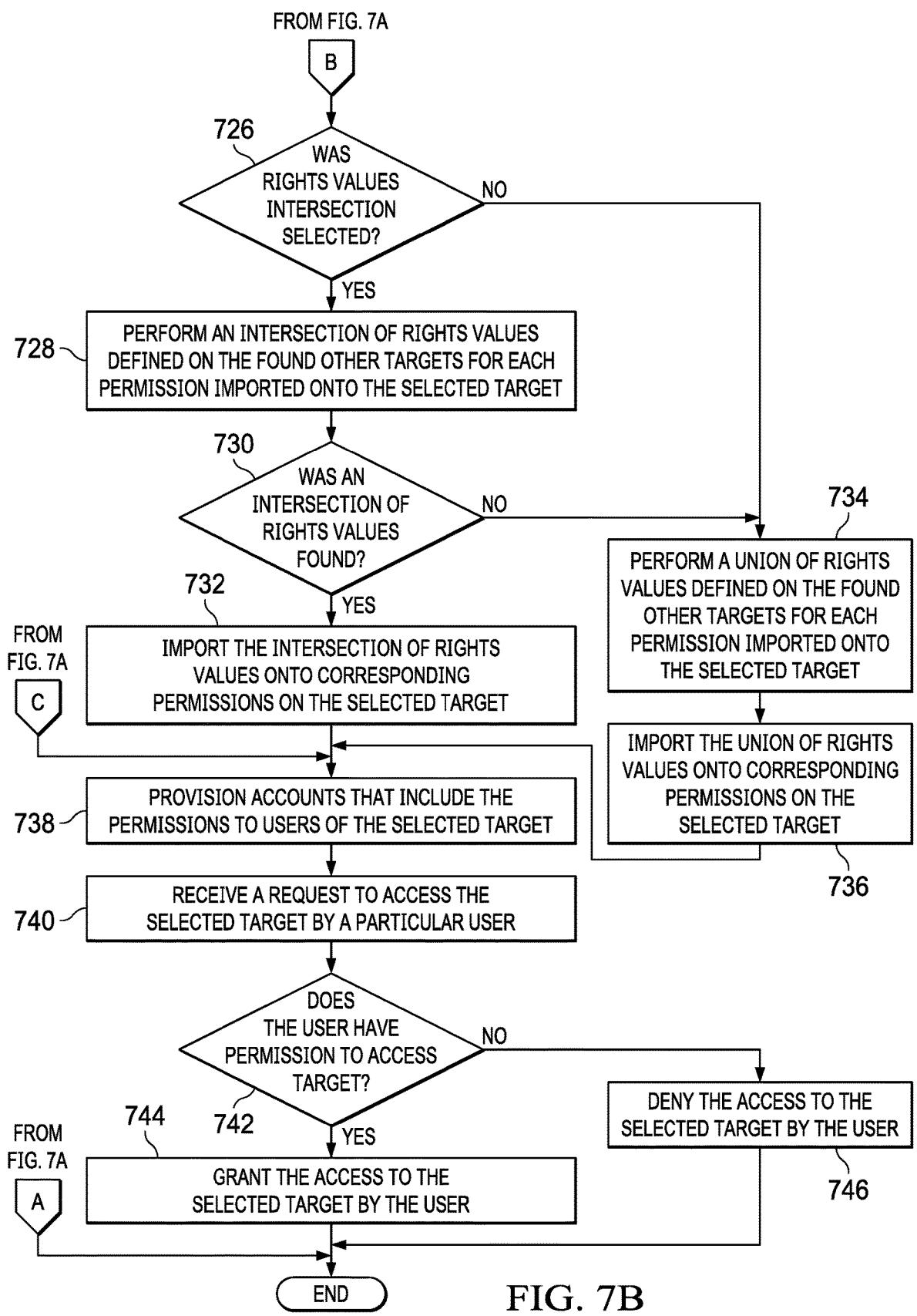

With reference now to FIGS. 7A-7B, a flowchart illustrating a process for automatically discovering attribute permissions is shown in accordance with an illustrative embodiment. The process shown in FIGS. 7A-7B may be implemented in a computer, such as, for example, server 104 in FIG. 1 or data processing system 200 in FIG. 2.

The process begins when the computer receives an input selecting a target protected resource to discover attribute permissions corresponding to the target protected resource (step 702). The target protected resource may be, for example, target protected resource 110 in FIG. 1. The attribute permissions may be, for example, attribute permissions 230 in FIG. 2.

The computer searches for other protected resource targets of a same type as the selected protected resource target, but excludes the selected protected resource target (step 704). The information regarding the other protected resource targets is stored in a persistent data store, such as, for example, relational database management system (RDBMS). The computer may utilize, for example, an API to perform the search. For example, illustrative embodiments may call the API when defining a new target or provisioning policy, or when discovering permissions for an existing target or provisioning policy that may not have all available permission definitions set on it yet. The search may be performed as a configured option, such as synchronously at the time of target creation or asynchronously (e.g., in the background) at some predefined time interval on existing targets.

The computer makes a determination as to whether other protected resource targets of the same type as the selected protected resource target were found in the search (step 706). If the computer determines that no other protected resource targets of the same type as the selected protected resource target were found in the search, no output of step 706, then the process terminates thereafter. If the computer determines that other protected resource targets of the same type as the selected protected resource target were found in the search, yes output of step 706, then the computer makes a determination as to whether attribute permission intersection was selected via user input (step 708).

If the computer determines that attribute permission intersection was selected, yes output of step 708, then the computer performs an intersection of attribute permissions on the found other protected resource targets in the search (step 710). In addition, the computer makes a determination as to whether an intersection of attribute permissions was found on the other protected resource targets (step 712). If the computer determines that no intersection of attribute permissions was found on the other protected resource targets, no output of step 712, then the process proceeds to step 716. If the computer determines that an intersection of attribute permissions was found on the other protected resource targets, yes output of step 712, then the computer imports the intersection of permissions onto the selected protected resource target (step 714). Thereafter, the process proceeds to step 720.

Returning again to step 708, if the computer determines that attribute permission intersection was not selected, no output of step 708, then the computer performs a union of attribute permissions on the found other protected resource targets in the search (step 716). Further, the computer imports the union of attribute permissions onto the selected protected resource target (step 718). Furthermore, the computer makes a determination as to whether discover rights values was selected via user input (step 720). The rights values may be, for example, rights values 232 in FIG. 2.

If the computer determines that discover rights values was not selected, no output of step 720, then the process proceeds to step 738. If the computer determines that discover rights values was selected, yes output of step 720, then the computer searches for rights values defined on each respective attribute permission imported onto the selected protected resource target (step 722). In addition, the computer makes a determination as to whether rights values corresponding to imported attribute permissions were found in the search (step 724).

If the computer determines that no rights values corresponding to imported attribute permissions were found in the search, no output of step 724, then the process proceeds to step 738. If the computer determines that rights values corresponding to imported attribute permissions were found in the search, yes output of step 724, then the computer makes a determination as to whether rights values intersection was selected via user input (step 726). If the computer determines that rights values intersection was selected, yes output of step 726, then the computer performs an intersection of rights values defined on the found other protected resource targets for each respective attribute permission imported onto the selected protected resource target (step 728).

The computer makes a determination as to whether an intersection of rights values was found (step 730). If the computer determines that no intersection of rights values was found, no output of step 730, then the process proceeds to step 734. If the computer determines that an intersection of rights values was found, yes output of step 730, then the computer imports the intersection of rights values onto corresponding attribute permissions on the selected protected resource target (step 732). Thereafter, the process proceeds to step 738.

Returning again to step 726, if the computer determines that rights values intersection was not selected, no output of step 726, then the computer performs a union of rights values defined on the found other protected resource targets for each respective permission imported onto the selected protected resource target (step 734). Further, the computer imports the union of rights values onto corresponding permissions on the selected protected resource target (step 736). Further, the computer provisions accounts, which include the attribute permissions, to users of the selected protected resource target to control access to the selected protected resource target by the users based on assigned attribute permissions in the accounts corresponding to the users (step 738).

Subsequently, the computer receives, via a network, a request to access the selected protected resource target from a particular user utilizing a client device (step 740). The computer makes a determination as to whether that particular user has permission to access the selected protected resource target based on assigned attribute permissions in the user's provisioned account (step 742). If the computer determines that the particular user does have permission to access the selected protected resource target, yes output of step 742, then the computer grants the access to the selected protected resource target by that particular user (step 744). Thereafter, the process terminates. If the computer determines that the particular user does not have permission to access the selected protected resource target, no output of step 742, then the computer denies the access to the selected protected resource target by that particular user (step 746). Thereafter, the process terminates.

Figure 8:
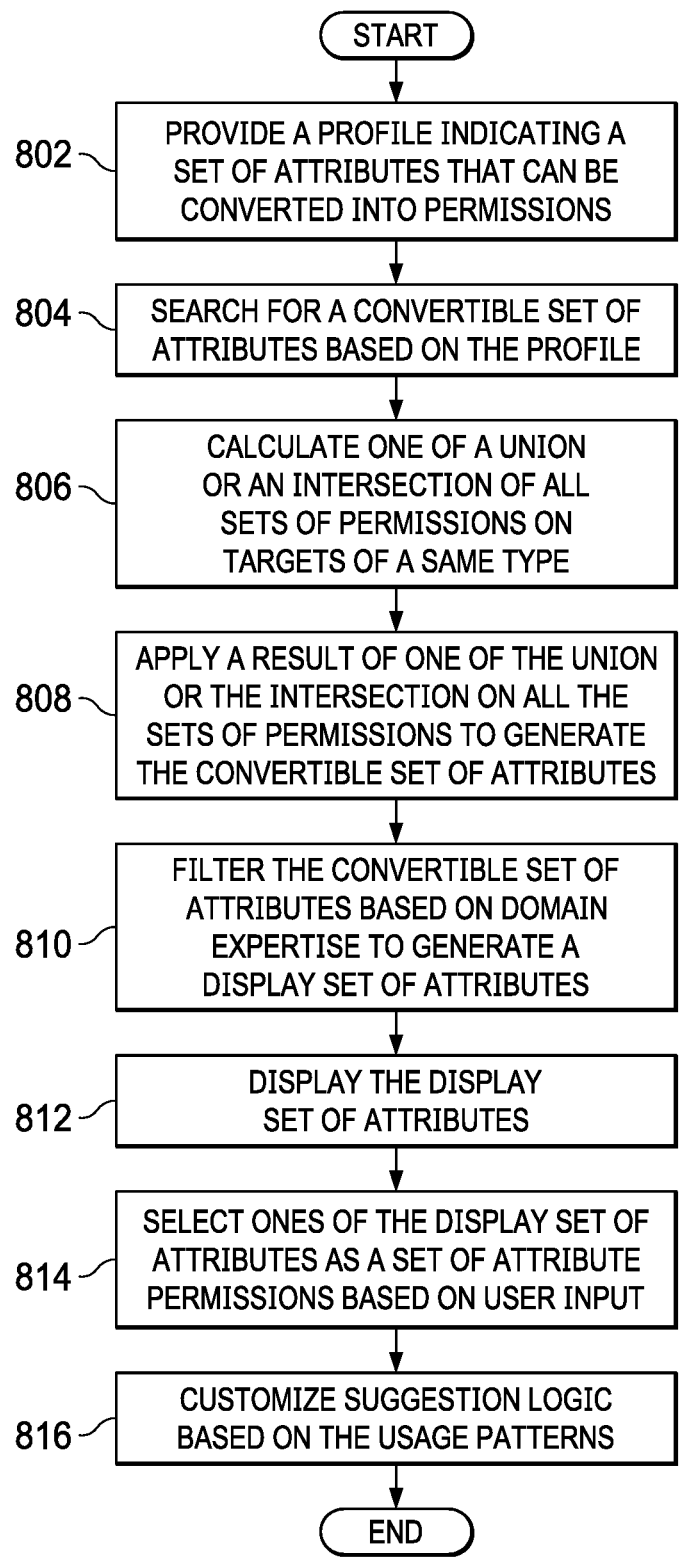
FIG. 8 is a flowchart illustrating a process for selecting a set of attribute permissions for a new target instance in accordance with an illustrative embodiment.

With reference now to FIG. 8, a flowchart illustrating a process for selecting a set of attribute permissions for a new target instance is shown in accordance with an illustrative embodiment. The process shown in FIG. 8 may be implemented in a computer, such as, for example, server 104 in FIG. 1 or data processing system 200 in FIG. 2.

The process begins when the computer provides a profile indicating a set of attributes that can be converted into permissions for a new target instance (step 802). In response to the computer detecting that the new target instance is being added, the computer searches for a convertible set of attributes for the new target instance based on the profile (step 804). The profile corresponds to a target of a same type as the new target instance for the search. The computer calculates one of a union or an intersection of all sets of permissions on targets of the same type based on user selection (step 806).

The computer applies a result of one of the union or the intersection on all the sets of permissions to generate the convertible set of attributes (step 808). The computer filters the convertible set of attributes based on domain expertise of usage patterns to generate a display set of attributes (step 810). The display set of attributes include attributes that are candidates for at least one or more of provisioning group access, entitlements, access certification and recertification, segregation of duties, and role mining. The display set of attributes also include attributes that are candidates for rights values defined on selected non-group-based attribute permissions.

The computer displays the display set of attributes in a graphical user interface (step 812). The computer selects ones of the display set of attributes as a set of attribute permissions for the new target instance in response to user input (step 814). The computer customizes suggestion logic based on the usage patterns including one of an identity of an administrator who defined attribute permissions on existing target instances or how frequently attribute permissions were assigned to users (step 816). Thereafter, the process terminates.

Thus, illustrative embodiments of the present invention provide a computer-implemented method, computer system, and computer program product for automatically discovering attribute permissions, along with their corresponding rights values, for a selected protected resource target by analyzing existing permission definitions and corresponding rights values of other protected resources of a same type as the selected protected resource target. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for automatically discovering resource attribute permissions, the method comprising:
providing, by a server computer, a resource profile indicating a set of resource attributes that can be converted into permissions to access a new network resource to be added to a network;
responsive to the server computer detecting that the new network resource is being added to the network, searching, by the server computer, for a convertible set of resource attributes for the new network resource based on the resource profile;
displaying, by the server computer, search results for the convertible set of resource attributes;
selecting, by the server computer, ones of the convertible set of resource attributes as a set of resource attribute permissions for the new network resource that controls user access to the new network resource;
provisioning, by the server computer, user accounts with the set of resource attribute permissions for the new network resource assigned to authorized client device users of the new network resource; and
controlling, by the server computer, the user access to the new network resource by particular client device users based on provisioned resource attribute permissions in respective user accounts corresponding to the particular client device users.

2. The method of claim 1, wherein the searching for the convertible set of resource attributes for the new network resource further comprises:
calculating, by the server computer, one of a union or an intersection of all sets of resource attribute permissions on existing network resources of a same type as the new network resource; and
applying, by the server computer, a result of one of the union or the intersection on all the sets of resource attribute permissions to generate the convertible set of resource attributes.

3. The method of claim 1 further comprising:
filtering, by the server computer, the convertible set of resource attributes based on domain expertise of usage patterns to generate a display set of resource attributes.

4. The method of claim 3, wherein the display set of resource attributes include attributes of existing network resources connected to the network that are candidates for at least one or more of provisioning user group access, user group entitlements, user access certification and recertification, segregation of user duties, and user role mining.

5. The method of claim 1, wherein the set of resource attribute permissions include rights values that include at least one of single-valued rights and multi-valued rights corresponding to the set of resource attribute permissions.

6. The method of claim 1, wherein the resource profile corresponds to an existing network resource connected to the network of a same type as the new network resource to be added the network.

7. The method of claim 1 further comprising:
customizing, by the server computer, suggestion logic based on usage patterns including one of an identity of an administrator who defined resource attribute permissions on existing network resources or how frequently resource attribute permissions were assigned to client device users.

8. The method of claim 1 further comprising:
responsive to the server computer determining that a new provisioning policy is being added, searching, by the server computer, for a set of existing policies of a same target type.

9. A server computer for automatically discovering resource attribute permissions, the server computer comprising:
a bus system;
a storage device connected to the bus system, wherein the storage device stores program instructions; and
a processor connected to the bus system, wherein the processor executes the program instructions to:
provide a resource profile indicating a set of resource attributes that can be converted into permissions to access a new network resource to be added to a network;
search for a convertible set of resource attributes for the new network resource based on the resource profile in response to detecting that the new network resource is being added to the network;
display search results for the convertible set of resource attributes;
select ones of the convertible set of resource attributes as a set of resource attribute permissions for the new network resource that controls user access to the new network resource;
provision user accounts with the set of resource attribute permissions for the new network resource assigned to authorized client device users of the new network resource; and
control the user access to the new network resource by particular client device users based on provisioned resource attribute permissions in respective user accounts corresponding to the particular client device users.

10. The server computer of claim 9, wherein the processor further executes the program instructions to:
calculate one of a union or an intersection of all sets of resource attribute permissions on existing network resources of a same type as the new network resource; and
apply a result of one of the union or the intersection on all the sets of resource attribute permissions to generate the convertible set of resource attributes.

11. The server computer of claim 9, wherein the processor further executes the program instructions to:
filter the convertible set of resource attributes based on domain expertise of usage patterns to generate a display set of resource attributes.

12. The server computer of claim 11, wherein the display set of resource attributes include attributes of existing network resources connected to the network that are candidates for at least one or more of provisioning user group access, user group entitlements, user access certification and recertification, segregation of user duties, and user role mining.

13. A computer program product for automatically discovering resource attribute permissions, the computer program product comprising a computer readable storage medium having program instructions embodied therewith, the program instructions executable by a server computer to cause the server computer to perform a method comprising:
providing, by the server computer, a resource profile indicating a set of resource attributes that can be converted into permissions to access a new network resource to be added to a network;
responsive to the server computer detecting that the new network resource is being added to the network, searching, by the server computer, for a convertible set of resource attributes for the new network resource based on the resource profile;
displaying, by the server computer, search results for the convertible set of resource attributes;
selecting, by the server computer, ones of the convertible set of resource attributes as a set of resource attribute permissions for the new network resource that controls user access to the new network resource;
provisioning, by the server computer, user accounts with the set of resource attribute permissions for the new network resource assigned to authorized client device users of the new network resource; and
controlling, by the server computer, the user access to the new network resource by particular client device users based on provisioned resource attribute permissions in respective user accounts corresponding to the particular client device users.

14. The computer program product of claim 13, wherein the searching for the convertible set of resource attributes for the new network resource further comprises:
calculating, by the server computer, one of a union or an intersection of all sets of resource attribute permissions on existing network resources of a same type as the new network resource; and
applying, by the server computer, a result of one of the union or the intersection on all the sets of resource attribute permissions to generate the convertible set of resource attributes.

15. The computer program product of claim 13 further comprising:
filtering, by the server computer, the convertible set of resource attributes based on domain expertise of usage patterns to generate a display set of resource attributes.

16. The computer program product of claim 15, wherein the display set of resource attributes include attributes of existing network resources connected to the network that are candidates for at least one or more of provisioning user group access, user group entitlements, user access certification and recertification, segregation of user duties, and user role mining.

17. The computer program product of claim 13, wherein the set of resource attribute permissions include rights values that include at least one of single-valued rights and multi-valued rights corresponding to the set of resource attribute permissions.

18. The computer program product of claim 13, wherein the resource profile corresponds to an existing network resource connected to the network of a same type as the new network resource to be added the network.

* * * * *